Patented Nov. 22, 1938

2,137,664

UNITED STATES PATENT OFFICE 2,137,664

α,β-DIHALOGENETHYLKETONES

Otto Bayer, Leverkusen, and Johannes Nelles, Leverkusen-Schlebusch, Germany, assignors to I. G. Farbenindustrie Aktiengesellschaft, Frankfort-on-the-Main, Germany No Drawing. Application November 6, 1936, Serial No. 109,610. In Germany November 12, 1935

5 Claims. (Cl. 260—592)

The present invention relates to new halogen containing ketones.

In accordance with our present invention new halogen containing ketones are obtained which probably correspond to the following general formula: acyl.CHX.CH$_2$X wherein X stands for a halogen atom. These compounds are obtainable by causing carboxylic acid halogenides to react upon vinyl halogenides in the presence of a Friedel Craft's catalyst. In most cases the reaction occurs at ordinary temperature and ordinary pressure. It may be performed in the presence of indifferent diluents, such as carbondisulfide, benzines or carbon tetrachloride. Examples for suitable catalysts are aluminium chloride, tin tetrachloride and ferric chloride. Examples for suitable carboxylic acid halogenides are acetyl chloride, propionic acid chloride, butyric acid chloride, isovaleric acid chloride, stearic acid chloride or benzoyl chloride.

The new products which are obtainable in accordance with our present invention are α,β-dihalogenethylketones. They show a remarkable tendency to split off hydrogen halide and to form β-halogen-vinyl-ketones, part of which is described in our copending application Ser. No. 82,672, filed May 29, 1936. The dihalogenethylketones represent valuable intermediate products for organic synthesis.

The following examples illustrate the invention the parts being by weight:

Example 1

10 parts of aluminium chloride are slowly introduced into 10 parts of benzoyl chloride while cooling and stirring and while excluding moisture. Simultaneously, gaseous vinyl chloride is led in. With absorption of the vinyl chloride the liquid gradually becomes more viscous. When absorption of the gas is complete the reaction mass is decomposed with ice water and hydrochloric acid. The phenyl-dichloro-ethylketone separates as a light brown solid substance, which melts when recrystallized from aceto-acetic acid at 57–58° C. On distillation under reduced pressure, the dihalogenated ketone splits off 1 mol of hydrogen chloride thereby forming the phenyl-chlorovinylketone of boiling point 133–135° C. under 18 mm. pressure.

Example 2

80 parts of acetyl chloride are dissolved in 160 parts of carbon tetrachloride, whereupon 30 parts of sublimed ferric chloride are introduced while excluding moisture and cooling externally. Simultaneously, vinyl chloride is introduced at an excess mercury pressure of 20 cms. The taking up of the vinyl chloride occurs very easily. After the reaction is complete the reaction mass is decomposed with ice water and hydrochloric acid and the solution of the ketone in carbon tetrachloride is separated, washed with water and dried. After evaporation of the carbon tetrachloride, the residue is distilled under reduced pressure. During the distillation hydrogen chloride is split off and the chlorovinylmethylketone is obtained as a colourless oil of boiling point 43–45° C. under 18 mm. pressure in a yield of about 80%.

Example 3

100 parts of palmkernel fatty acid chloride are mixed with 150 parts of carbon tetrachloride and while excluding moisture introduced into 55 parts of aluminium chloride while thoroughly stirring and cooling the mixture for several hours vinylchloride being added simultaneously. The reaction being finished the mixture is added into ice-water. The carbon tetrachloride layer is separated, washed with water and dried. Thereupon the solvent is distilled off preferably at reduced pressure. The remaining oil represents a mixture of the dichloroethylketone and the chlorovinylketone.

Example 4

50 parts of isovaleric acid chloride are mixed with 150 parts of petroleum ether and introduced into vinylchloride, 40 parts of aluminiumchloride being added simultaneously in the course of two hours while stirring and cooling the mixture. The vinylchloride is quickly dissolved. The reaction temperature is preferably kept below 10°. The conversion being finished the reaction mass is decomposed with ice-water and the petroleumether layer washed with ice-water several times. The solvent is distilled off preferably at a reduced pressure. Upon distillation at a reduced pressure the remaining oil splits off hydrogen chloride and is converted into isobutyl-β-chlorovinylketone of the boiling point 72–74° at 18 mm. pressure.

We claim:—

1. The product of the probable formula

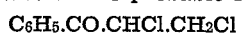
C$_6$H$_5$.CO.CHCl.CH$_2$Cl this product being substantially identical with that obtainable by causing benzoylchloride to react upon vinyl chloride in the presence of a Friedel Craft's catalyst.

2. The process which comprises reacting vinyl halogenides upon carboxylic acid halogenides in the presence of a Friedel Craft's catalyst.

3. The process which comprises reacting vinyl chloride with carboxylic acid chloride in the presence of a Friedel Craft's catalyst.

4. The process which comprises reacting acetyl chloride with vinyl chloride in the presence of a Friedel Craft's catalyst.

5. The process which comprises reacting benzoylchloride with vinyl chloride in the presence of a Friedel Craft's catalyst.

OTTO BAYER.
JOHANNES NELLES.